Patented Sept. 18, 1928.

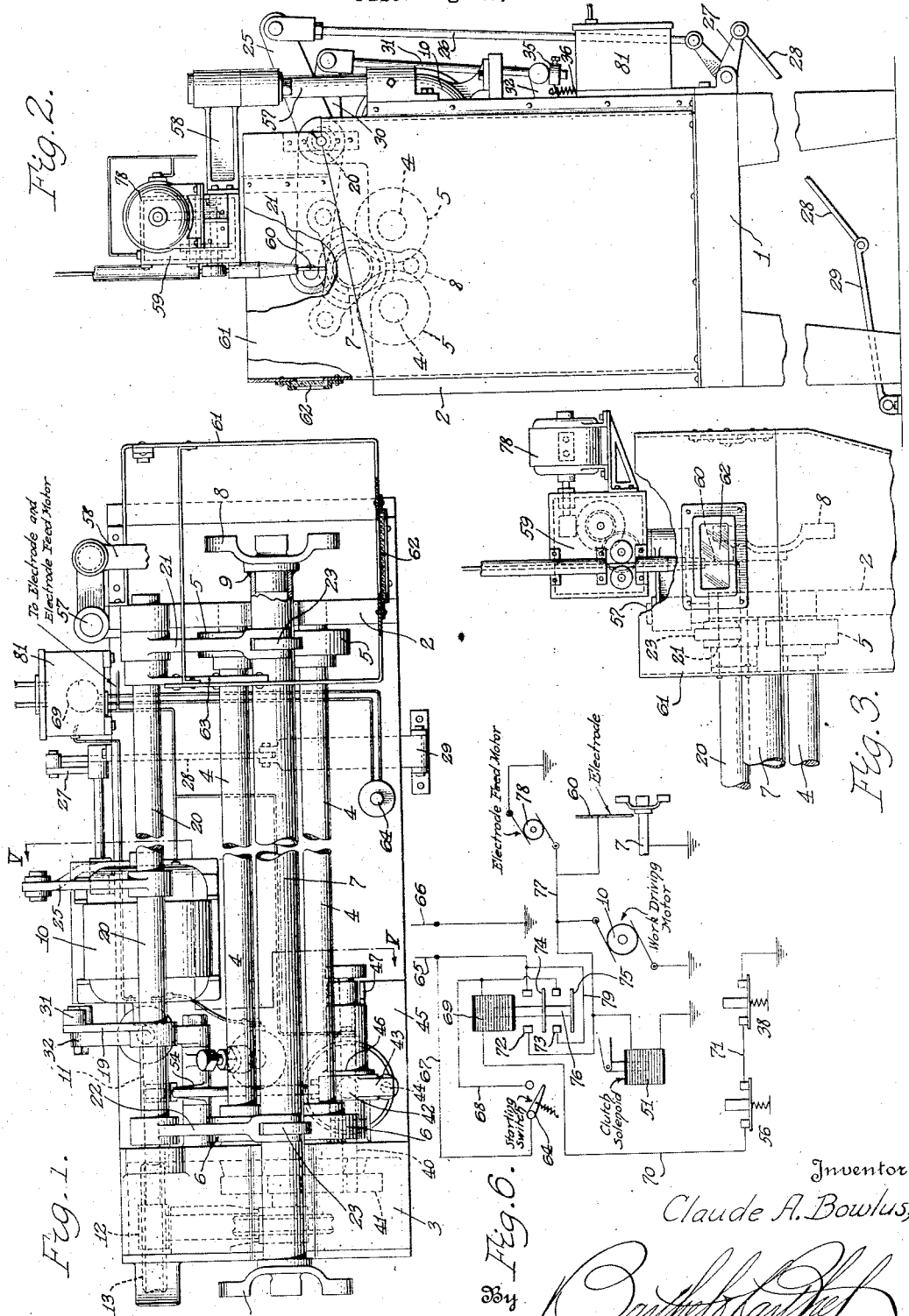

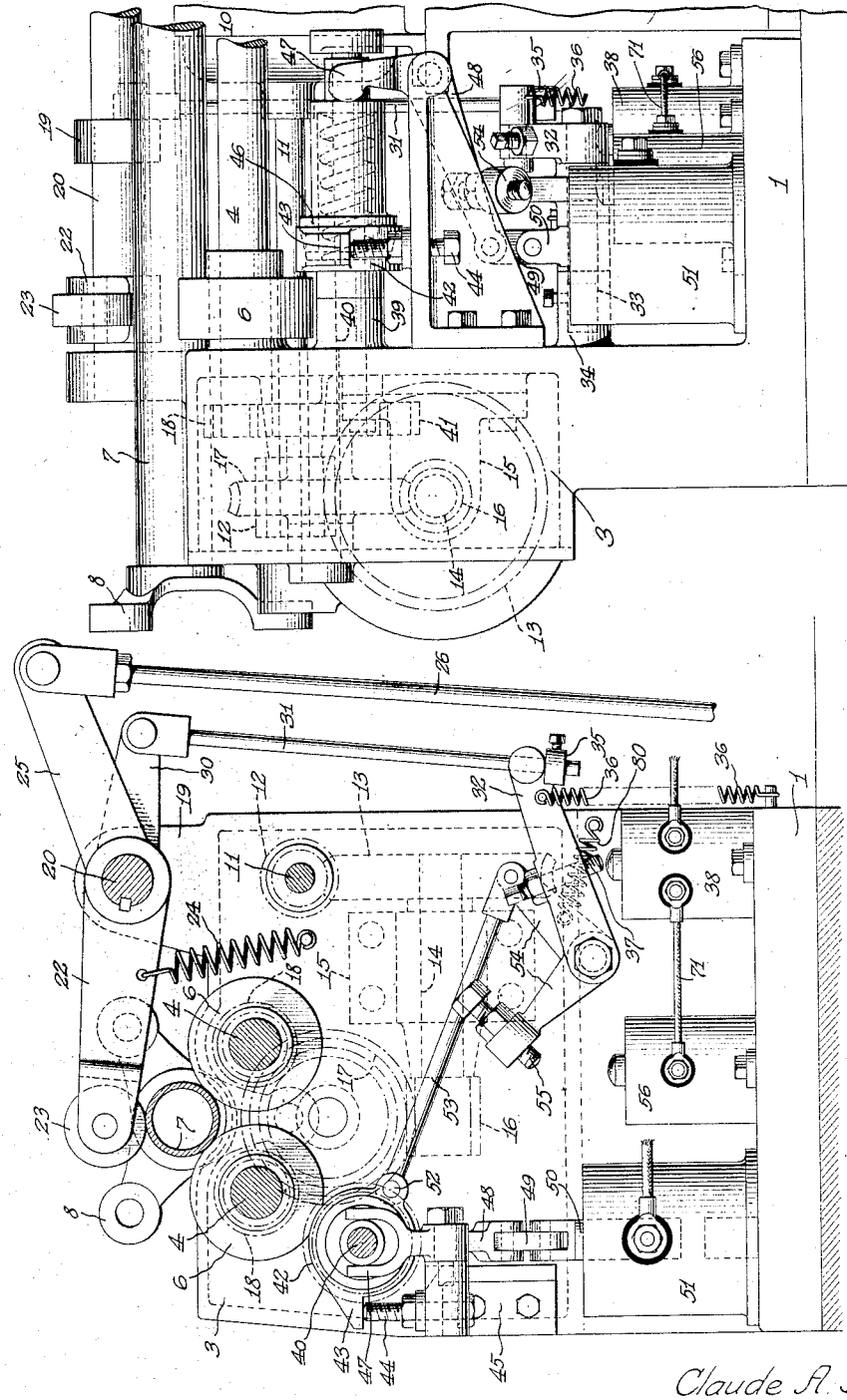

1,684,726

UNITED STATES PATENT OFFICE.

CLAUDE A. BOWLUS, OF BIRMINGHAM, MICHIGAN.

ARC WELDING MACHINE.

Application filed August 15, 1925. Serial No. 50,395.

This invention relates to welding machines and has special reference to that class of machines wherein a continuous welding operation is carried on in contradistinction to spot welding, the machine being specially designed for manipulating a piece of work that can be revolved relative to a welding electrode, so that a seam or joint between two pieces of work may be expeditiously and thoroughly welded.

My invention aims to provide a durable machine that is semi-automatic and my improvements may be characterized in the following particulars.

First, there is a pair of driven rolls, constituting a rotary support, on which a piece of work may be placed and frictionally held in engagement with the pair of rolls to be driven thereby. Novel means is employed for establishing the friction driving relation between the pair of rolls and piece of work with said means arranged to interrupt the driving relation and cause a cessation in the operation of the machine when the welding electrode "freezes" relative to the piece of work and tends to displace the the piece of work.

Second, the welding arc of the machine is substantially surrounded by a shield adapted to protect the eyes of an operator and a portion of the shield is movable and articulated with a switch adapted to control the arc circuit, so that should the shield be moved there will be a cessation in the operation of the machine whereby the welding arc will be discontinued and will not be injurious to the eyes of a workman looking at the exposed welding electrode.

Third, a novel timing mechanism is used in connection with the welding machine for a welding cycle of a piece of work, the mechanism being timed so that when the welding cycle has been completed the machine will be stopped and the attendant of the machine may remove the welded article and place another article in place for a welding operation. The timing mechanism includes a clutch or registering device associated with electrical devices so that the machine is semi-automatic in its operation.

The above are a few of the advantages gained by my invention and others will hereinafter appear as the machine is described in detail by aid of the drawings which will now be considered.

Figure 1 is a plan of the welding machine;

Fig. 2 is a view of one end of the machine with the shield partly broken away and partly in section;

Fig. 3 is a front elevation of a portion of the machine;

Fig. 4 is a similar view of another portion f the machine;

Fig. 5 is a cross sectional view taken on the line V—V of Fig. 1; and

Fig. 6 is a diagrammatic view of the electrical wiring in connection with parts of the welding machine.

In the drawings, the reference numeral 1 denotes a frame work or bench provided with housings 2 and 3 and journaled in said housings is a pair of longitudinally disposed roll spindles 4 having end rolls 5 and 6 adapted to support a piece of work 7. This piece of work, by the way of an example, has been shown as a tubular drive shaft or casing having its ends provided with coupling members 8 which are adapted to be welded on the drive shaft at a joint or seam 9. The welding is adapted to be performed as the piece of work 7 is revolved by frictional contact with the rolls 5 and 6, and for driving these rolls the following electrically operated means is employed.

On the frame work 1 or in proximity thereto is an electric motor 10 which has its armature shaft 11 provided with a worm 12 meshing with a worm wheel 13 on a transverse shaft 14, journaled in a bearing 15, in the housing 3. The transverse shaft 14 has a worm 16 meshing with a large worm or gear wheel 17 which in turn meshes with gear wheels 18 on the roll spindles 4, as shown by dot and dash lines in Fig. 5.

The housings 2 and 3 are provided with bearings 19 for a longitudinally disposed rock shaft 20 and on said rock shaft are fixed work contact members 21 and 22 having the outer ends thereof provided with anti-friction rollers 23 normally held in frictional contact with the piece of work 7 by a heavy duty retractile spring 24 connecting the housing 3 and the work contact member 22. The spring 24 causes the work contact member to press upon the piece of work and frictionally hold it in engagement with the rolls 5 and 6 so that the piece of work will be revolved thereby.

On the rock shaft 20, intermediate the ends thereof, is a fixed crank 25 which extends rearwardly and has its outer end pivotally connected by a rod 26 to a bell crank 27 supported by the rear edge of the frame work 1. The bell crank 27 is connected by a rod 28 to a treadle 29 at the front side of the machine, so that the foot of an operator or attendant of the machine may depress the treadle 29 and cause the work contact members 21 and 22 to be elevated, so that a finished piece of work may be removed and another piece of work placed in position on the sets of rolls 5 and 6.

The rock shaft 20 has another crank 30 with its end provided with a connecting rod 31 extending downwardly and through the outer end of a switch arm 32 pivotally mounted on a stud 33 fixed in a socket 34 of the housing 3. The connecting rod 31 is loose in the end of the switch arm 32 so that it may slide therethrough when the work contact members are to be swung upwardly and the piece of work 7 removed. However, the end of the connecting rod 31 has an adjustable collar or abutment 35 normally engaged by the switch arm 32, which is retained in engagement with the abutment 35 by a light duty retractile spring 36 connecting the switch arm 32 to the frame work 1 of the machine. The switch arm 32 has an adjustable contact member 37 adapted to actuate a conventional form of plunger switch 38 on the frame work 1. The housing 3 is provided with a bearing 39 for a timer shaft 40 extending into the housing 3 and driven by a small gear wheel 41 from the motor driven gear wheel 17, which is suitably supported within the housing 3. Loose on the outer end of the timer shaft 40 is a clutch member 42 provided with a lug 43 adapted to impinge against an adjustable stop 44, carried by a bracket 45 secured to the housing 3. Engageable with the clutch member 42 is a spring retracted clutch member 46 slidably carried on the timer shaft 40 and adapted to be driven thereby. The clutch members 42 and 46 have been shown of the cone type, but it is obvious, as will hereinafter appear, that disk clutches, planetary gearing or the like may be substituted therefor. The clutch member 46 is adapted to be held in engagement with the clutch member 42 by the fork 47 of a bell crank 48 pivotally mounted on the end of a bracket 45. The bell crank 48 is operatively connected by a link 49 to the core 50 of a solenoid switch 51 on the frame work 1. The loose clutch member 42 has an ear 52 pivotally conected by a rod 53 to one end of a bell crank 54 loose on the stud 33 adjacent the crank 32. The opposite end of the bell crank 54 constitutes a switch arm and has an adjustable contact member 55 adapted to engage and actuate a plunger switch 56 similar to the plunger switch 38. The plunger switch 56 is on the frame work 1 and in proximity to the switches 38 and 51.

At the rear side of the housing 2 is an upright support 57 for a swingable bracket 58 which supports a conventional form of motor driven feeding mechanism, generally designated 59, for a guided welding electrode 60 which extends in proximity to the piece of work so as to cooperate with the piece of work in producing a welding arc at the seam or joint 9.

Mounted on the housing 2 is a hinged or shiftable shield 61 provided with a conventional form of window 62 so that the workman or attendant of the machine may observe the electric arc without injury to the eyes. This hinged shield is attached to a crank 63 on the rock shaft 20, so that if the shield 61 is opened the shaft 20 will be rocked and the switch arm 32 released to open the switch 38 and interrupt the operating electric circuit of the machine. Or, when the shaft 20 is rocked incident to removing the work contact members from a piece of work, the shield 61 will be opened so that the piece of work may be placed in position, it being understood that the side wall of the shield is cut away to provide clearance for the piece of work and yet form a protecting shield about the end of the piece of work to be welded. In the first instance, there is a safety factor for the sight because the operator of the machine can not raise the shield and observe the naked welding arc for immediately upon the shield being opened the operating circuit of the machine is interrupted.

Before considering the operation of the machine, reference will be had to Figure 6 showing the electrical connections which include a starting switch 64 at a convenient place on the machine, preferably near the treadle 29 so that an operator in front of the machine may readily remove a finished piece of work, place an unfinished piece of work in position, and control the machine.

65 and 66 denote leading in wires from a suitable source of electrical energy and the wire 65 is connected to the starting switch 64 by a wire 67 and said switch by a wire 68 to a solenoid switch 69 located in a suitable casing 81 supported adjacent the housing 2 of the machine. The solenoid switch 69 is connected by a wire 70 to the plunger switches 56 and 38, which are connected by a wire 71 and the plunger switch 38 grounded. The solenoid 69 includes sets of contacts 72 and 73 with the contacts 72 adapted to be connected by a member 74 and the contact 73 by a member 75, said members being on the shiftable core 76 of the solenoid.

One of the contact members 72 is connected to the leading in wire 65 and the other contact member 72 is connected by a wire 77 to the clutch solenoid 51 and the motor 78 which operates the feeding mechanism of the welding electrode 60. The solenoid 51 and the motor 78 are grounded.

The wire 77 is also connected to the work driving motor 10 and to the welding electrode 60, the motor being suitably grounded and the electrode being grounded through the piece of the work 7. One of the contact members 73 is connected by a wire 78 to the wire 68 and the other contact member 73 is connected by a wire 79 to the leading in wire 65.

When a piece of work is to be placed on the machine, the operator or attendant of the machine depresses the treadle 29 and the shaft 20 is rocked to raise the work contact members 21 and 22 so that there is sufficient clearance above the sets of rolls 5 and 6 to permit of the piece of work 7 being placed on the rolls. When the treadle 29 is depressed the spring 24 is stressed and the connecting rod 31 rides through the switch arm 32, which may be lowered to actuate the switch 38, but this switch can accomplish nothing because the starting switch 64 is still open. When the treadle 29 is released the retractile force of the spring 24 closes the work contact members so that the piece of work 7 frictionally engages the sets of rolls 5 and 6. Elevation of the connecting rod 31 restores the switch arm 32 to normal position.

With the piece of work 7 in position, the operator now closes the starting switch and the solenoid 69 and the plunger switches 56 and 38 are placed in an operative circuit. When the solenoid switch 69 is energized the contact members 72 are bridged and a circuit established for the clutch solenoid 51, the work driving motor, the electrode feed motor 78, and the welding electrode 60. The work driving motor 10 having been started, the sets of rolls 5 and 6 are driven causing the piece of work 7 to be revolved and the continuous welding operation performed at the joint or seam 9, which operation in one revolution of the piece of work, may be considered a welding cycle, which is controlled by the timing mechanism. Placing the sets of rolls in operation has also placed the shaft 40 in operation and since the clutch members 42 and 46 are held engaged by the plunger switch 51 and the bell crank 48, the loose clutch member 42 will be turned in a clockwise direction, viewing Fig. 5. As this is accomplished, the lug 43 is moved away from the stop 44 and the connecting rod 53 rocks the bell crank 54 and the plunger switch, which is normally closed, is actuated and opened. The relation or movement of the bell crank 54 relative to the switch 56 is such that before the switch is opened to interrupt the circuit a welding cycle has been performed. When the circuit is interrupted by the switch 56 there is a cessation in the operation of the motors 10 and 78 and consequently the motor driven timer shaft 40 ceases to revolve. Interrupting the operating circuit de-energizes the clutch solenoid 51 thereby releasing the clutch member 46 so that the retractile force of the spring associated with said clutch member may retract the clutch member and free the clutch member 42. Then the retractile force of the spring 80, connecting the bell crank 54 to the housing 3, restores the bell crank 54 to normal position and causes the clutch member 42 to revolve in a counter-clockwise direction until the lug 43 impinges against the stop 44.

It will be noted that the operation circuit of the machine is automatically interrupted when the welding cycle has been performed, and this is a signal to the attendant of the machine to depress the treadle 29, shift the work contact members 22, the shield 61, and remove the finished piece of work so that an unfinished piece of work may be placed in position.

In carrying on these welding operations there are times when the welding electrode 60 freezes to the piece of work 7 and to prevent the machine from being injured by such event, the work contact members 22 are brought into action. These work contact members 21 and 22 will be slightly raised by the piece of work 7 as it is raised in freezing to the welding electrode. Actuation of the work contact members 21 and 22 causes the connecting rod 31 to release the switch arm 32 so that the spring 36 thereof may cause the switch arm to open the plunger switch 38, thereby interrupting the operating circuit of the machine so that there is cessation in the operation of the machine incident to freezing of the welding electrode and the piece of work.

To obviate the necessity of the machine operator holding his hand on the starting switch to retain the same closed, the set of contacts 73 are employed, these contacts being bridged to establish the operating circuit and permit of the starting switch being released, said switch being preferably in the form of a push button.

As pointed out in the beginning, the shield 61 can not be raised without interrupting the operating circuit and it is thought unnecessary to trace out all of the electrical circuits in view of Fig. 6.

While the drawing has been made from a machine successfully operated, yet I desire it to be understood that the structural elements are susceptible to such changes as are permissible by the appended claims.

What I claim is:—

1. A welding machine comprising a rotary support by which a piece of work is moved relative to a movable welding electrode, electrical driven means by which said piece of work and electrode are moved in synchronism, an electric circuit for said electrically driven means, switches in said circuit, manually actuated means for controlling one of said switches, means controlled by a welding cycle of operation adapted to actuate the other switch, and a shield for the welding electrode, said shield being operatively connected to one of said switches so that opening of said shield opens said switch and breaks said electric circuit causing a cessation in the operation of the machine.

2. A welding machine comprising a rotary support by which a piece of work is moved relative to a movable welding electrode, electrically driven means by which said piece of work and electrode are moved in synchronism, an electric circuit for said electrically driven means, switches in said circuit, manually actuated means for controlling one of said switches, and a work contact member controlled by a welding cycle of operation and normally engaging a piece of work and adapted to be manually moved, which movement causes the other switch to be opened and said circuit interrupted.

3. In a welding machine wherein a welding arc is maintained in connection with a piece of work:—electrically driven means adapted to move the piece of work, a movable shield for the welding arc, and means actuated by movement of said shield adapted to cause a cessation in the operation of said electrically driven means.

4. In a welding machine wherein a welding arc is maintained in connection with a piece of work by a welding electrode, and wherein the welding electrode is liable to freeze relative to the piece of work:—means adapted to interrupt the arc circuit when such freezing occurs, said means including a support for a piece of work, and a work contact member adapted to be shifted by the piece of work incident to freezing to interrupt the welding circuit.

5. A welding machine as called for in claim 4 wherein said work support is electrically driven, and a switch actuated by said work contact member controls the electric drive of said work support.

6. In a welding machine wherein a piece of work is moved for a continuous weld;— means adapted to move the piece of work, said means comprising a driven rotary support on which the piece of work rests, and a shiftable contact member pressing on the piece of work to establish a frictional driving relation between the rotary support and the piece of work to cause the piece of work to move for a continuous weld, electrical means for driving said support, a switch in said means, and an operative connection between said means and said shiftable contact member, whereby shifting of the latter interrupts the operation of the driven rotary member.

7. In a welding machine wherein a driven piece of work has a welding cycle relative to an electric welding arc maintained by an electric circuit including a normally closed switch;—timing means for the welding cycle, said means including releasable clutch members driven in synchronism with the piece of work, and a switch arm actuated by said clutch members and adapted to open said switch, interrupt said electric circuit, and cause a cessation in the welding cycle, said switch arm restoring one of said clutch members to normal position.

8. In a welding machine wherein a driven piece of work has a welding cycle relative to an electric welding arc maintained by an electric circuit including a normally closed switch;—timing means for the welding cycle, said means including releasable clutch members driven in synchronism with the piece of work, an energized solenoid maintaining said clutch members normally in engagement with each other, means dependent on the deenergizing of said solenoid for disengaging said clutch members, a switch arm actuated by said clutch members and adapted to open said switch, interrupt said electric circuit, and cause a cessation in a welding cycle, said solenoid being in circuit with said switch so that opening of said switch deenergizes said solenoid.

In testimony whereof I affix my signature.

CLAUDE A. BOWLUS.